United States Patent [19]

Oulman

[11] Patent Number: 4,938,678
[45] Date of Patent: Jul. 3, 1990

[54] ADJUSTABLE CLAMP FRAMES FOR THERMO FORM MACHINE

[75] Inventor: James N. Oulman, Forest City, Iowa

[73] Assignee: Winnebago Industries, Inc., Forest City, Iowa

[21] Appl. No.: 254,179

[22] Filed: Oct. 6, 1988

[51] Int. Cl.$^5$ .............................................. B29C 51/26
[52] U.S. Cl. ................................... 425/397; 269/119;
   269/239; 425/400; 425/403.1; 425/DIG. 48
[58] Field of Search ............... 425/DIG. 48, 388, 397,
   425/400, 403.1; 269/111, 118, 119, 121, 142,
   237, 239

[56] References Cited

U.S. PATENT DOCUMENTS

| | | | |
|---|---|---|---|
| 811,647 | 2/1906 | Love | 249/162 |
| 986,134 | 3/1911 | Callahan | 249/26 |
| 2,891,466 | 6/1959 | Foster | 249/157 |
| 2,907,069 | 10/1959 | Butzko | 269/237 |
| 3,287,765 | 11/1966 | Puente | 425/DIG. 48 |
| 3,600,746 | 8/1971 | Kostur | 269/119 |
| 3,687,412 | 8/1972 | Vaughan et al. | 249/158 |
| 3,827,683 | 8/1974 | Seborg et al. | 425/397 |
| 3,841,819 | 10/1974 | Diamond | 425/DIG. 48 |
| 3,881,856 | 5/1975 | Fougea | 425/432 |
| 3,888,453 | 6/1975 | Jeffreys | 249/82 |
| 3,910,747 | 10/1975 | Dean et al. | 425/DIG. 48 |
| 3,931,951 | 1/1976 | Fougea | 249/158 |
| 3,951,376 | 4/1976 | Berndt et al. | 249/146 |
| 3,999,736 | 12/1976 | Theodorsen | 249/91 |
| 4,018,551 | 4/1977 | Shuman | 425/DIG. 48 |
| 4,097,035 | 6/1978 | Shuman | 425/DIG. 48 |
| 4,402,484 | 9/1983 | Kataishi et al. | 249/129 |
| 4,778,375 | 10/1988 | Mente | 425/DIG. 48 |

FOREIGN PATENT DOCUMENTS 51-27259  8/1976  Japan ........................... 425/DIG. 48

Primary Examiner—James C. Housel
Attorney, Agent, or Firm—Burd, Bartz & Gutenkauf

[57] ABSTRACT

An adjustable clamp frame assembly for holding different sizes of plastic sheets in a thermo form machine. The frame assembly has longitudinal and transverse beams carrying clamp units that hold a plastic sheet on the beams. The longitudinal and transverse beams are movable along rails of a rectangular frame to change the lateral distance between both the longitudinal and transverse beams to accommodate different sizes of plastic sheets.

41 Claims, 10 Drawing Sheets

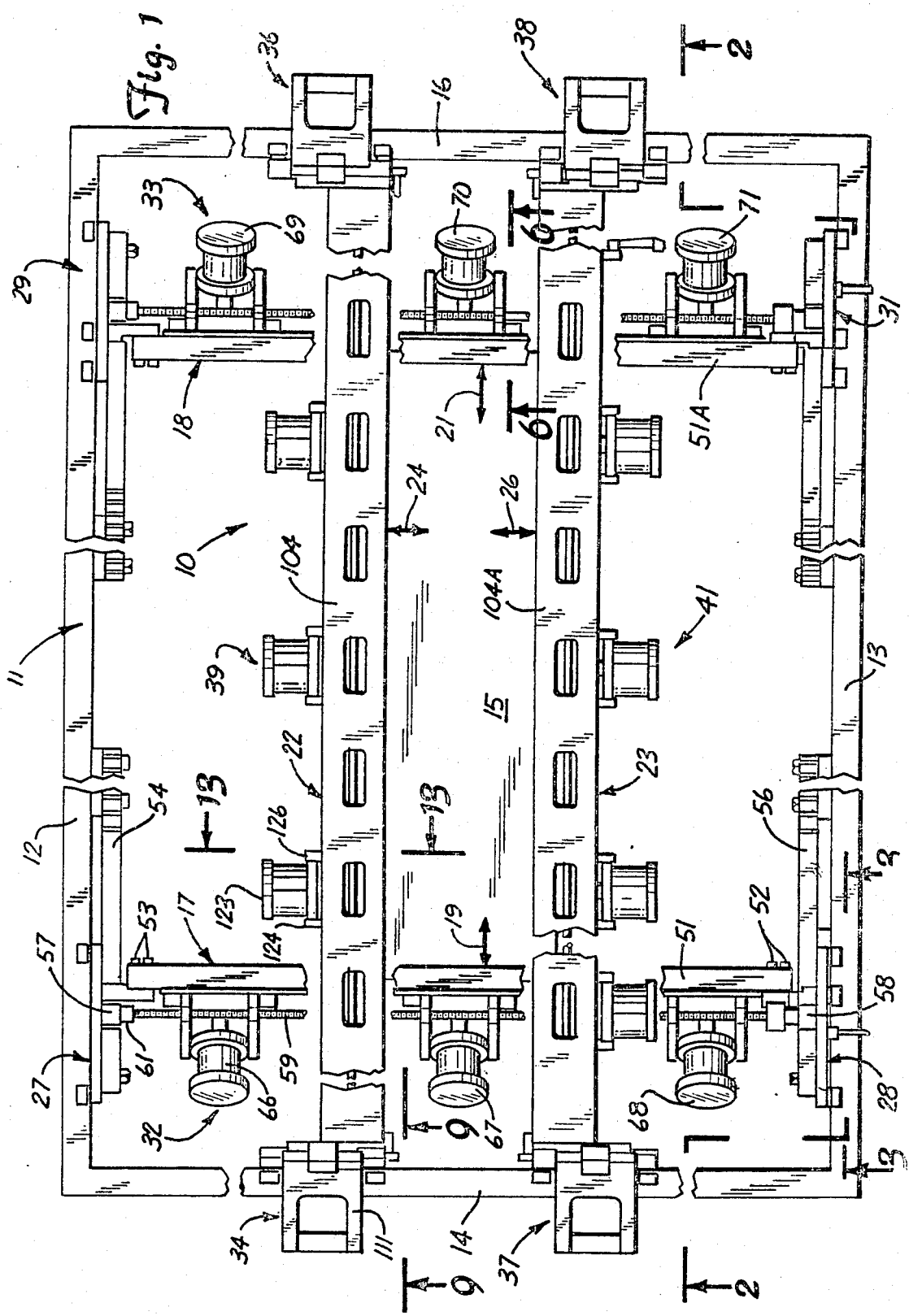

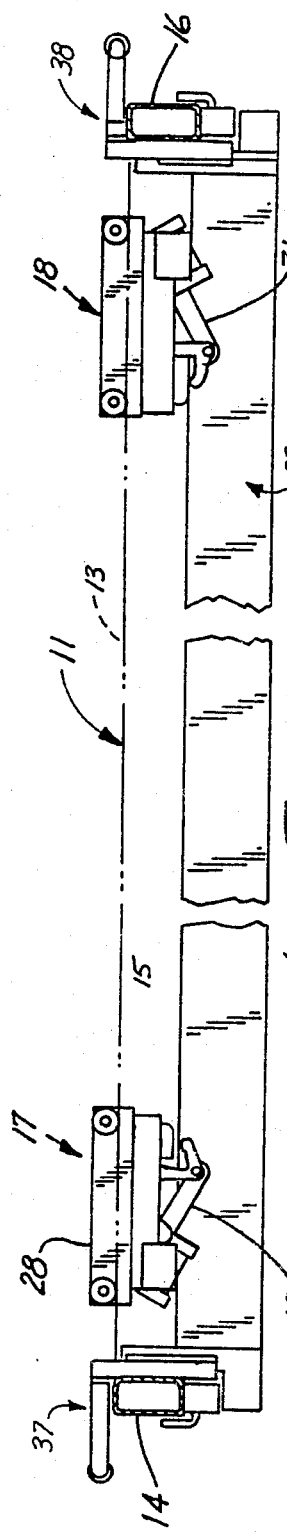
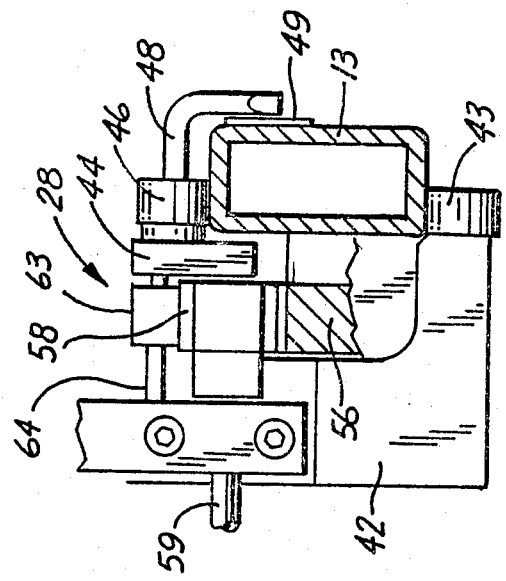
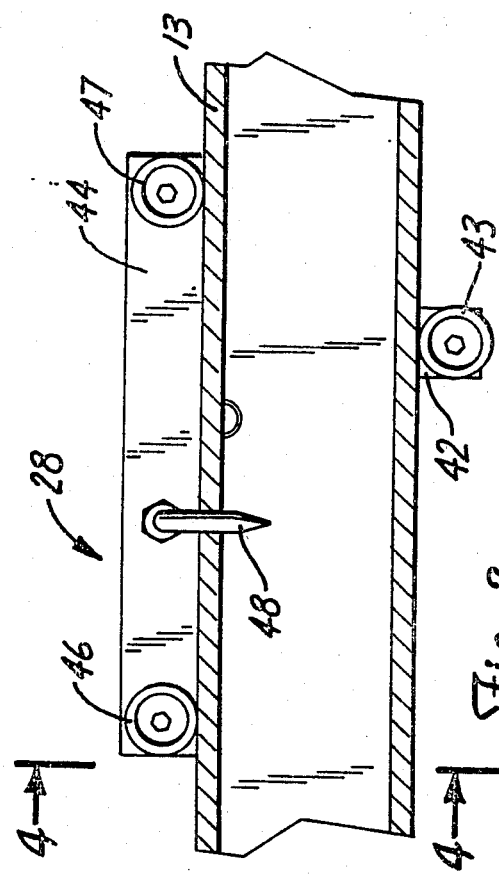

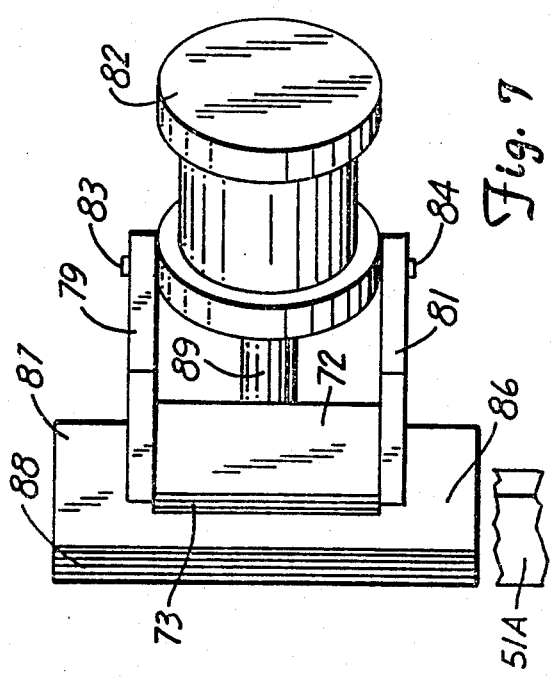
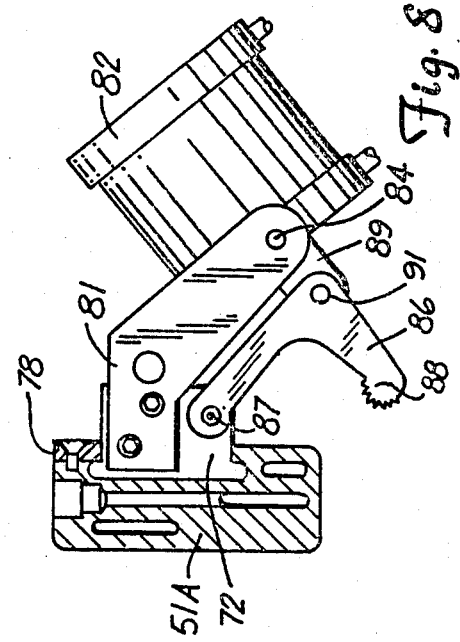
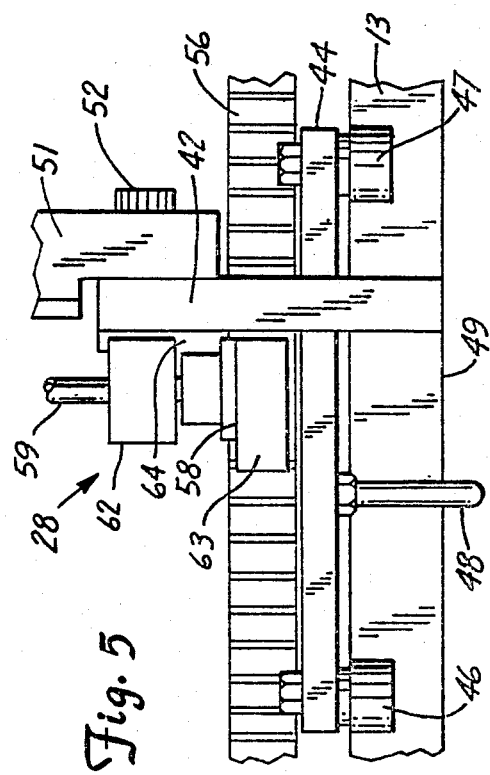
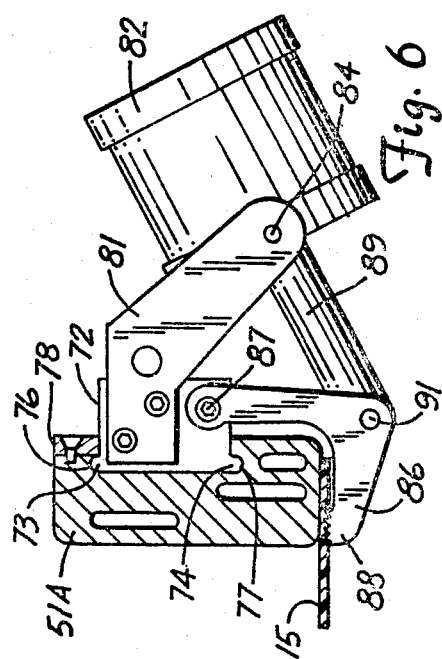

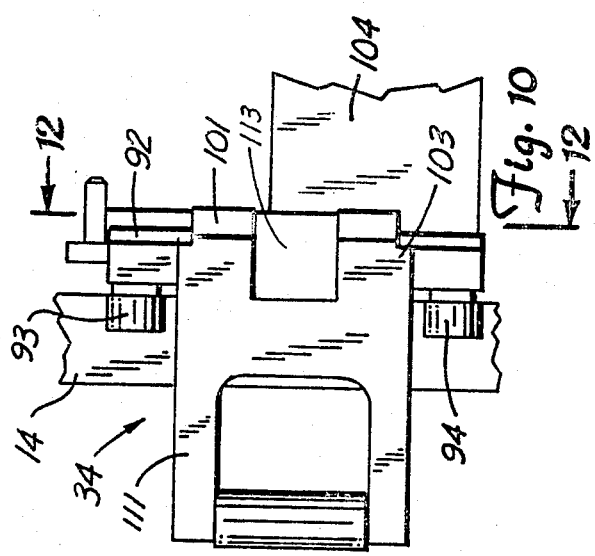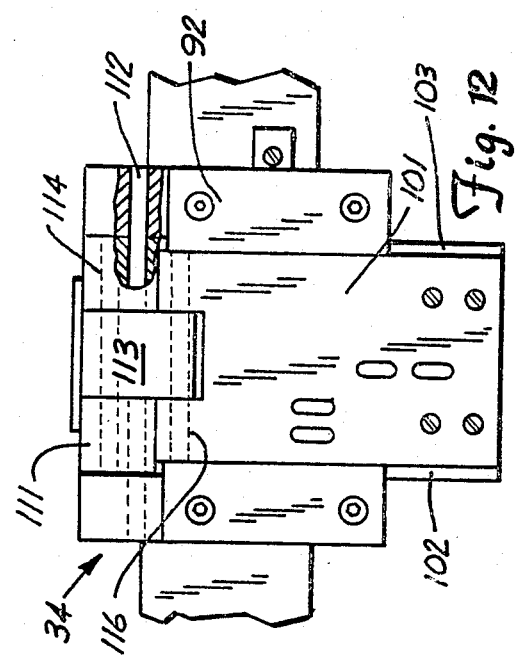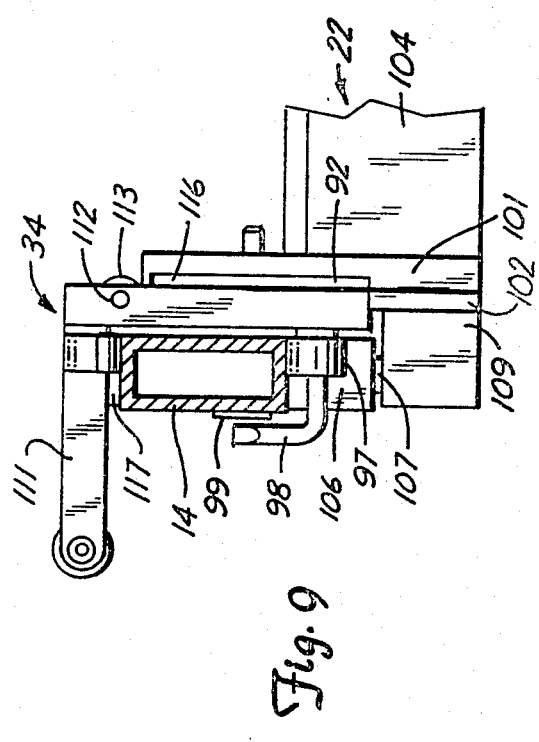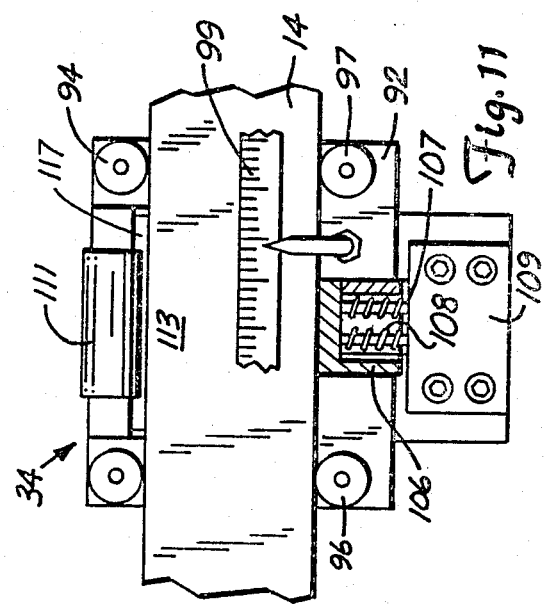

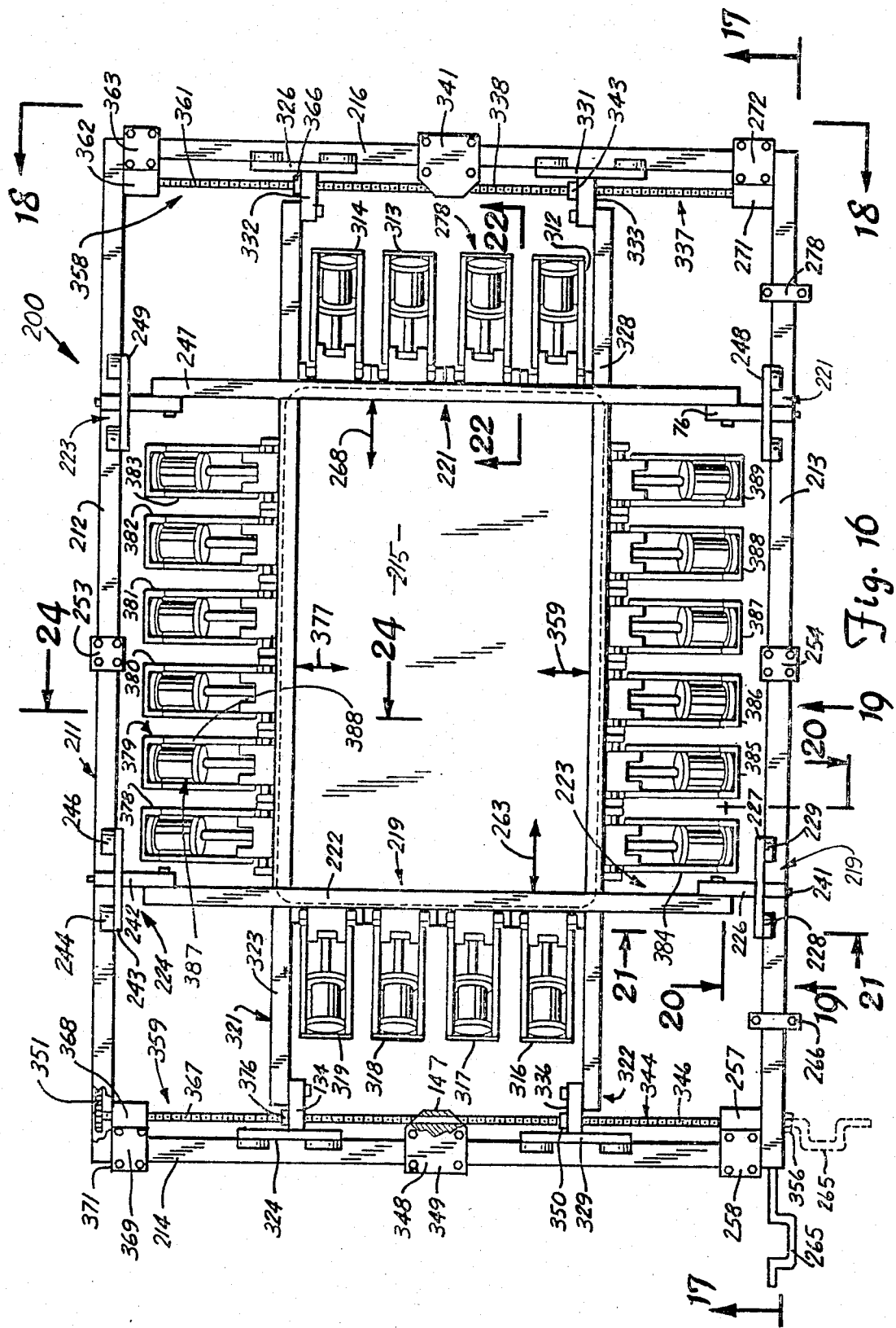

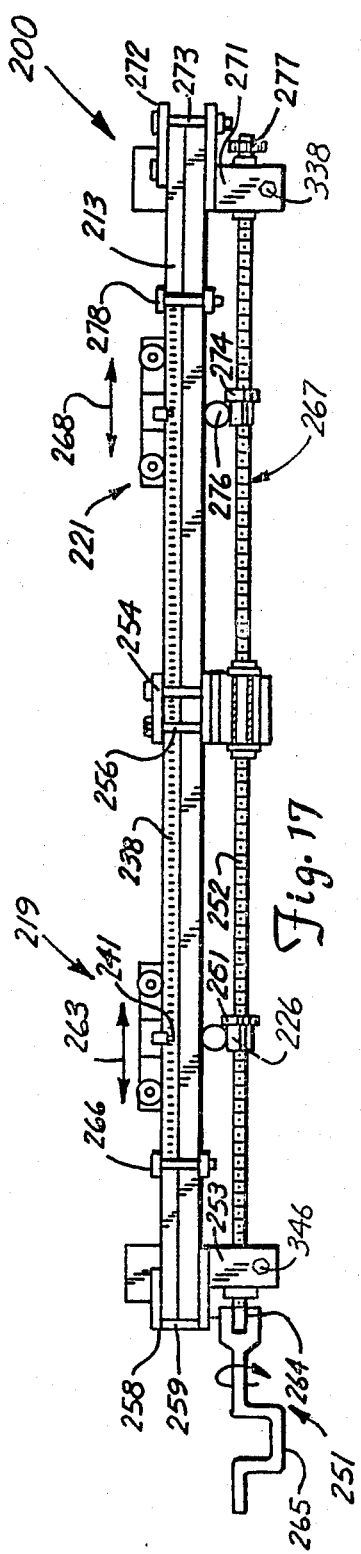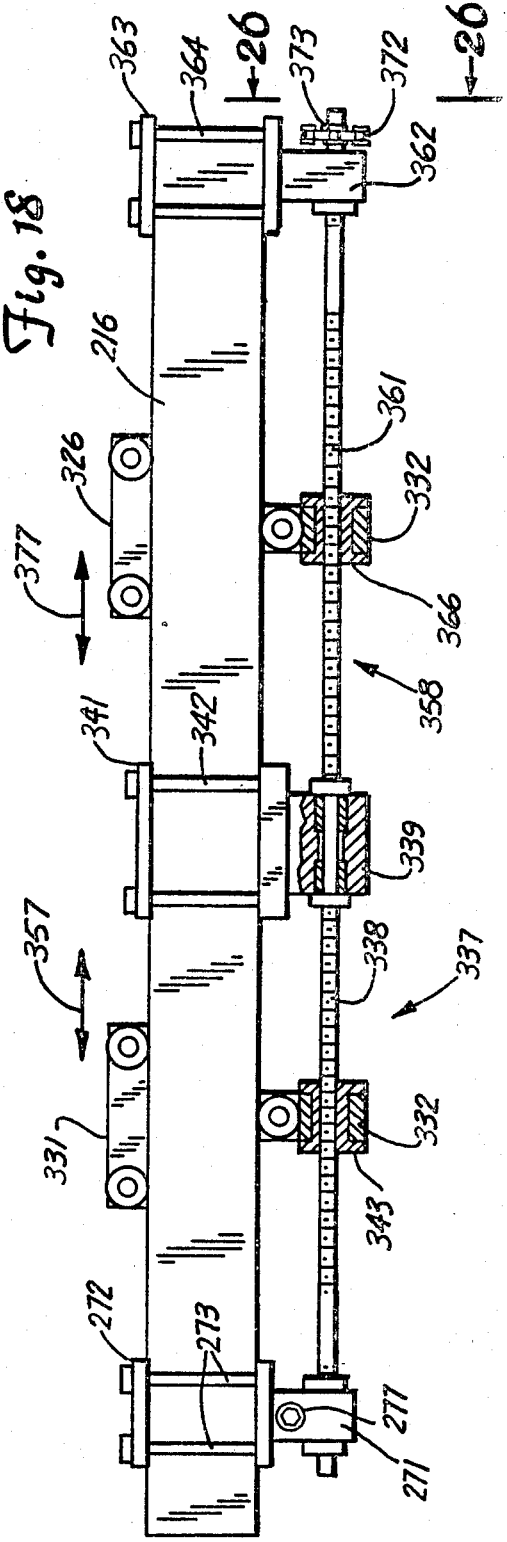

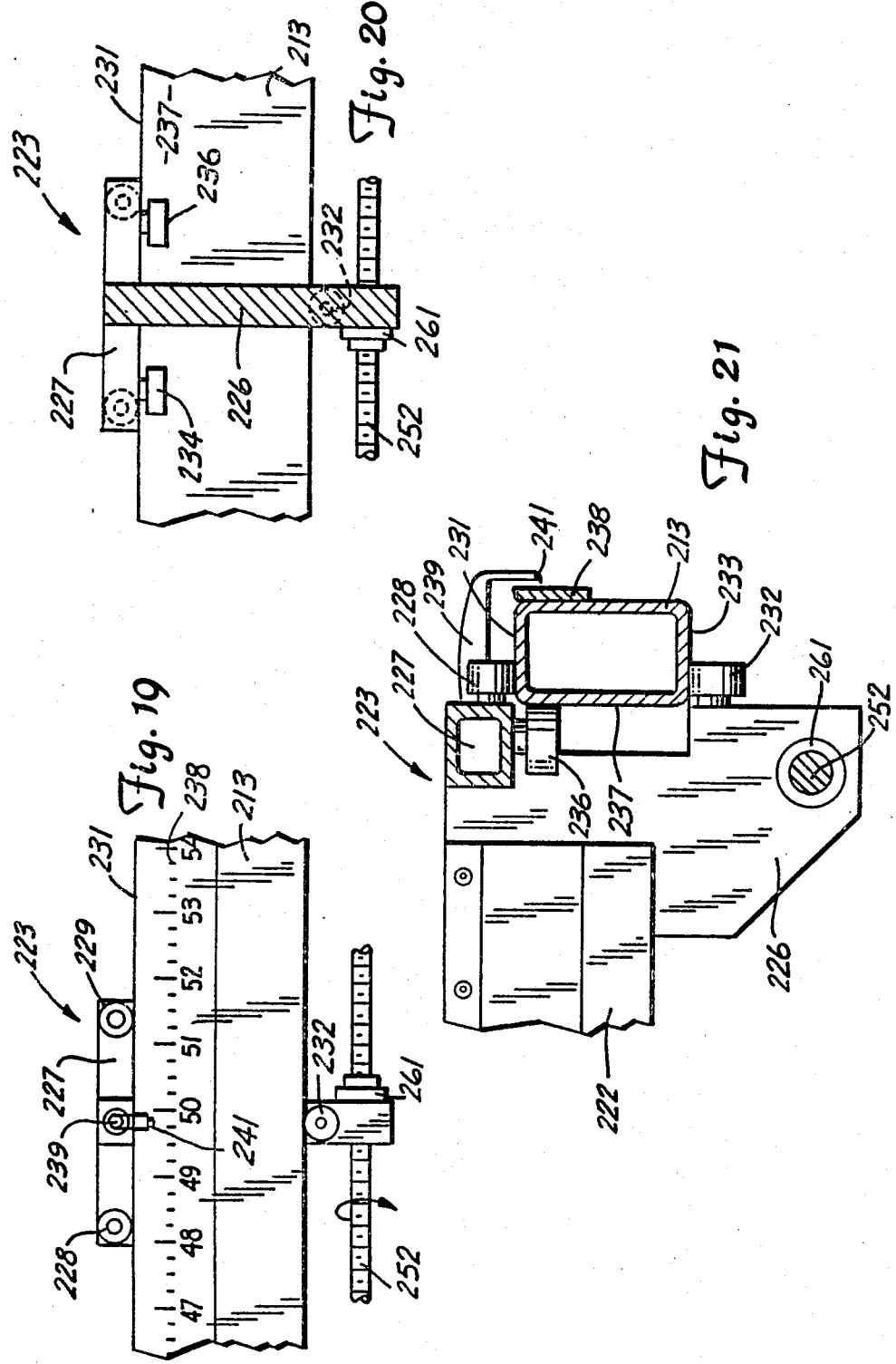

ADJUSTABLE CLAMP FRAMES FOR THERMO FORM MACHINE

FIELD OF INVENTION

The invention is in the field of frames used to hold plastic sheets in place during a thermo forming procedure. The frame has adjustable members that permit rapid adjustment to accommodate different sizes of plastic sheets.

BACKGROUND OF INVENTION

Sheet fed thermo form machines have clamp frames which hold a plastic sheet of thermal formable plastic in place during the heating and forming cycles of the machines. The machines can be provided with different sets of clamp frames to facilitate the use of different sized plastic sheets. The clamp frames must be changed when different sized plastic sheets are to be formed. This can take from thirty minutes on a small single station machine and two to three hours on a large rotary thermo forming machine. The changing of the clamp frames is normally done immediately after a job is completed so that the clamp frames are hot which requires considerable undesirable work and time to set up for a new job. Each time that the plastic sheet size is changed for dimensions greater than one half inch, the clamp frames must be changed. This requires the disconnecting of air lines, removing transverse clamp frames, and loosening the two longitudinal clamp frames. The longitudinal clamp frames are moved in or out to new settings to match the size of the new plastic sheet. Different transverse clamp frames are required and mounted on the machine frames. All of the bolts are then tightened and the air lines are reconnected. This process is counterproductive to modern manufacturing techniques that require quick tool changes to reduce the non-productive time of the machine. The tedious adjustment of the clamp frames prohibits profitable short production runs which minimize material and finished product inventories. The adjustable clamp frames of the invention have overcome the disadvantages of the prior clamp frames for thermo form machines by providing a clamp frames that are quickly adjustable to the required dimensions without removing parts, disconnecting air lines, and loosening and tightening nuts and bolts.

SUMMARY OF INVENTION

The invention is directed to adjustable clamp frame assembly for holding a plastic sheet in a selected position in a thermo form machine. The clamp frame assembly has longitudinal and transverse beams carrying a plurality of clamping units that are quickly and accurately adjustable relative to each other to obtain infinite rectangular dimensions of the frame assembly to accommodate different sized plastic sheets. The beams are adjustable with a minimum amount of time and labor and without the use of any special tools or the tightening and loosening of bolts and similar fasteners. The adjustable clamp frame assembly is adaptable to modern rapid manufacturing procedures that require quick and accurate changes in work holding structures to minimize non-productive machine time and allow for short production runs so as to reduce the plastic sheet inventory as well as finished product inventory.

The adjustable clamp frame assembly is used with the rectangular frame of the thermo form machine. This frame has first and second rail means that are angularly positioned relative to each other. A first beam means supporting a plastic sheet is movably mounted on the first rail means for movement along the first rail means. A means which can be manually operated may be used to move the first beam along the first rail means and hold the first beam in a selected adjusted position. First clamp means are mounted on the first beam means to hold the sheet material on the first beam means. A second beam means extends across the first beam means for holding portions of the sheet material on the second beam means. The second beam means is mounted for movement on the second rail means. Holding means functions to retain the second beam means in a selected second position on the second rail means. The movements of the first and second beam means allows different sizes of plastic sheets to be held on the frame assembly. A second clamp unit mounted on the second beam means is operable to hold opposite edge portions of the plastic sheet on the second beam means. The first and second clamp means are releasable so that the plastic sheet can be placed on the frame assembly and removed therefrom. The first beam means has bottom surfaces that engages opposite side edges of the plastic sheet. The first clamp means operates to hold the side edges of the plastic sheet on the first beam means. The second beam means has a bottom surface adjacent the bottom surface of the first beam means. The second clamp means is operable to hold opposite end edges of the plastic sheet in engagement with the bottom surface of the second beam means. This allows for relative adjusting movements the first and second beam means to accommodate differences in the width and length of the plastic sheets.

A preferred embodiment of the adjustable clamp frame assembly is used to hold a plastic sheet in a thermo form machine. The clamp frame assembly is used with a generally rectangular frame made of longitudinal side rails and transverse end rails that are normally disposed relative to the side rails. This frame is normally part of the thermo form machine. First and second longitudinal beams extend between the end rails. A first movable support or roller assembly having a rollers support the ends of the longitudinal beams on the end rails for linear movement along these rails. The movable supports are equipped with releasable locking clamps that are used to hold the longitudinal beams in selected positions in accordance with the width of the plastic sheet held by the frame assembly. Clamp units mounted on the longitudinal beams hold opposite edges of the plastic sheet on the beams. Second movable supports or roller assemblies connected to opposite ends of the transverse beam supports these beams on the side rails of the frame of the machine for linear movement along these rails. The second supports have releasable locks or latches used to hold the transverse beams in selected locations in accordance with the length of the plastic sheet. Clamp units mounted on the transverse beams hold opposite ends of the plastic sheet in engagement with bottom surfaces of these beams. The clamp units have linear actuators, such as air or hydraulic fluid cylinders, that are operable to hold the plastic sheet on the longitudinal and transverse beams and release it from the beams.

Another embodiment of the adjustable clamp frame assembly for holding a plastic sheet in forming relation with a thermo form machine has a pair of laterally spaced longitudinal beams and a pair of laterally spaced transverse beams defining a rectangular space for accommodating a plastic sheet. The beams are adjustable relative to each other to obtain infinite rectangular dimensions to accommodate different sized plastic sheets. A first movable supports or roller assemblies has a plurality of rollers that movably mount the first and second beams on the end rails for linear movement along the end rails of the frame of the machine. A first adjusting mechanism comprising elongated screws and drive means connecting the screws are operable to move the first beam along the end rails and hold the first beam in a selected position. A second adjusting mechanism having elongated screws drivably connected together is connected to the second beam along the end rails and hold the second beam in a selected position relative to the first beam. The adjustment of the positions of the first and second beams alters the lateral distance between the first and second beams to accommodate different widths of plastic sheets. A plurality of separate clamp units are mounted on the first and second beams to hold the opposite side edges of the plastic sheet on the beams. Each clamp unit has a movable member and a linear actuator connected to the movable member operable to move the movable member from a first holding position to a second release position. The clamp frame assembly has third and fourth transverse beams that are extended between the side rails across the first and second beams. Second movable supports or roller assemblies having a plurality of rollers movably mount the third and fourth beams on side rails for movement along the side rails. Adjusting mechanisms, such as elongated screws, are connected to the third and fourth beams to separately move these third and fourth beams along side rails and these third and fourth beams in selected positions relative to each other. This changes the longitudinal dimension of the clamp frame assembly to accommodate different lengths of sheets. A plurality of clamp units are mounted on the third and fourth beams and are operable to hold opposite end edges of the sheet on the third and fourth beams. The second clamp units are releasable so that the plastic sheet can be placed on and removed from the clamp frame assembly. Each clamp unit on the transverse beams has a body and means releasably mounting the body on a beam so that the clamp unit can be selectively removed from and mounted on a selected beam. The first and second beams have bottom surfaces that engage the side edges of the plastic sheet. The first clamp units are operable to hold the side edges of the sheet in engagement with the bottom surfaces of the first and second beams. The third and fourth beams have bottom surfaces that engage the end edges of the plastic sheet. The second clamp units function to hold the end edges of the plastic sheet in engagement with the bottom surfaces of the third and fourth beams. This allows for the adjacent bottom surfaces of the respective beams to slide unrestricted perpendicular to each other so as to permit infinite adjustment in the rectangular dimensions of the clamp frame assembly to accommodate different sizes of plastic sheets.

The objects and advantages of the clamp frame assembly are embodied in the structure and operation thereof as herein set out in the following detailed description including the drawing.

DESCRIPTION OF DRAWING

FIG. 1 is a top plan view of frame of a thermo form machine equipped with the adjustable clamp frame assembly for holding a plastic sheet;
FIG. 2 is a sectional view taken along FIG. 2—2 of FIG. 1;
FIG. 3 is an enlarged sectional view taken along line 3—3 of FIG. 1;
FIG. 4 is a sectional view taken along line 4—4 of FIG. 3;
FIG. 5 is a top view of FIG. 4;
FIG. 6 is an enlarged sectional view taken along the line 6—6 of FIG. 1;
FIG. 7 is a top view of FIG. 6;
FIG. 8 is a sectional similar to FIG. 6 showing the clamping jaw in the open position;
FIG. 9 is an enlarged sectional view taken along the line 9—9 of FIG. 1;
FIG. 10 is a top view of FIG. 9;
FIG. 11 is a front elevational view of FIG. 9;
FIG. 12 is a sectional view taken along line 12—12 of FIG. 10;
FIG. 16 is a top plan view of the frame of a thermo form machine equipped with a modification of the adjustable clamp frame assembly of the invention;
FIG. 17 is a front elevational view taken along line 17—17 of FIG. 16;
FIG. 18 is an enlarged end view of the right end taken along line 18—18 of FIG. 16;
FIG. 19 is an enlarged sectional view taken along the line 19—19 of FIG. 16;
FIG. 20 is an enlarged sectional view taken along the line 20—20 of FIG. 16;
FIG. 21 is an enlarged sectional view taken along the line 21—21 of FIG. 16;
FIG. 26 is an elevational of the back of FIG. 16 showing the chain drive for the screws.

DESCRIPTION OF PREFERRED EMBODIMENTS

Figure 13:
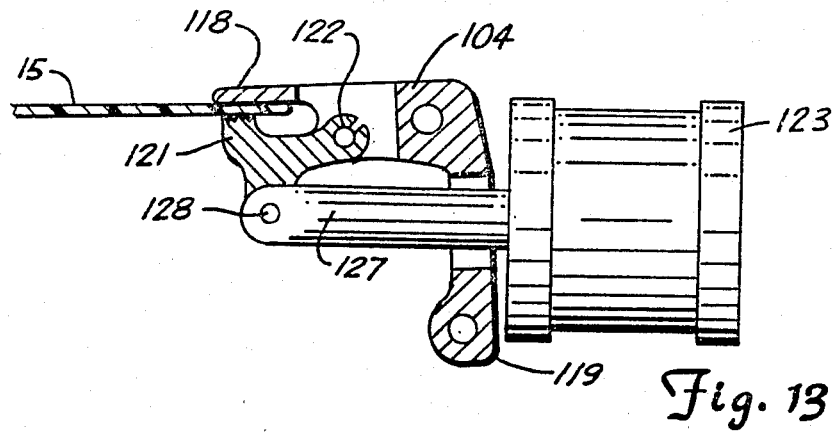
FIG. 13 is an enlarged sectional view taken along line 13—13 of FIG. 1.
Figure 14:
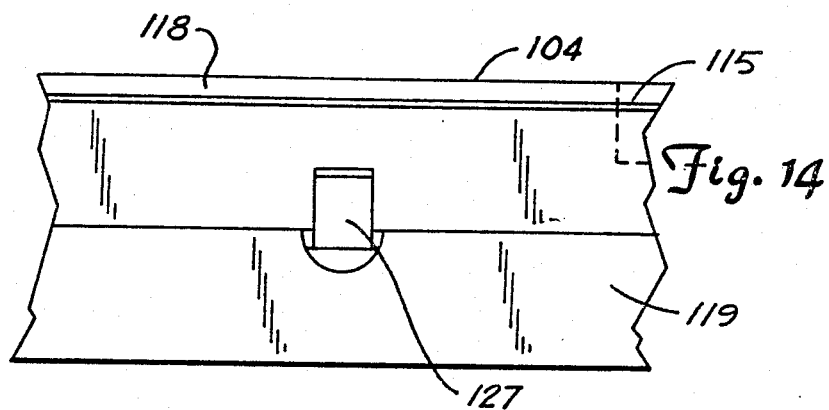
FIG. 14 is a front elevational view of FIG. 13.

Referring to FIG. 1, there is shown the work holding apparatus of the invention indicated generally at 10 supporting a sheet 15 of thermoformable plastic on a generally rectangular frame 11 of a conventional thermo form machine. Apparatus 10 is an adjustable clamp frame assembly usable with the conventional thermo form machines that reshape plastic sheet 15, such as an ABS plastic sheet, with the use of heat, vacuum or pressure. Apparatus 10 has transverse and longitudinal frame assemblies that are laterally and longitudinally adjustable to obtain infinite rectangular dimensions to accommodate different sizes of plastic sheets. The adjustment can be made in a relatively short period of time without the use of special tools or removing parts, making the apparatus versatile in use, as well as saving considerable time and a labor in running thermo form machines.

Thermo form machines have a generally rectangular frame 11 comprising a pair of longitudinal side beams or rails 12 and 13 joined at their opposite ends to end beams or rails 14 and 16. Rails 12, 13, 14 and 16 form the rectangular frame 11 which is mounted on the thermo form machine (not shown) for movement relative to a mold having the outline or contour of the product. The machines can have several frames located on a turntable so that the sequence of loading, heating, forming, and unloading the machine can be simultaneously accomplished. Some machines have a single station wherein the steps of forming a plastic sheet are done in sequence.

Apparatus 10 has first or transverse carriage assemblies indicated generally at 17 and 18 extended across frame 11 and movably mounted on side rails 12 and 13. Carriage assemblies 17 and 18 are longitudinally adjustable along side rails 12 and 13 as indicated by the arrows 19 and 21 to compensate for differences in the length of a plastic sheet that is to be mounted on apparatus 10. Located below carriage assemblies 17 and 18 are longitudinal carriage assemblies 22 and 23 which extend between the end rails 14 and 16 and are movably mounted thereon. The carriage assemblies 22 and 23 are laterally or transversely movable as indicated by the arrows 24 and 26 to accommodate in differences in the widths of plastic sheet 15 that is to be retained by the work holding apparatus 10. The longitudinal and transverse adjustments of carriage assemblies 17, 18 and 22, 23 can be separately made to accommodate for differences in sizes of the plastic sheets.

Movable supports 27 and 28 secured to opposite ends of the transverse carriage assemblies 17 and 18 are carried by rails 12 and 13. Similar moveable supports 29 and 31 on opposite ends of transverse carriage assembly 18 are carried by rails 12 and 13. Each transverse carriage assembly 17 and 18 has a clamping apparatus indicated generally as 32 and 33 operable to clamp only opposite ends of plastic sheet 15.

Longitudinal carriage assembly 22 has movable supports 34 and 36 at its opposite ends that ride on rails 14 and 16. Moveable supports 37 and 38 on opposite ends of carriage assembly 23 also ride on rails 14 and 16. The longitudinal carriage assembly 22 has clamping apparatus 39 adapted to clamp onto one side of plastic sheet 15. A similar clamping apparatus 41 on longitudinal carriage assembly 23 clamps onto the opposite side of sheet 15. Clamp apparatus 32, 33, 39 and 41 are simultaneously operable to clamp onto the four peripheral edges of plastic sheet 15 and retain plastic sheet 15 during the heating and forming processes of the machine.

Moveable supports 27, 28, 18 and 31 are identical in structure. The following description is directed to moveable support 28 shown in detail in FIGS. 3 to 5. Support 28 is a roller assembly having a generally L-shaped body 42. A bottom roller 43 is rotatably mounted on body 2. Roller 43 rides on the bottom of rail 13. A longitudinal bar 44 is secured to top of body 42 and rotatably supports a pair of top rollers 46 and 47. Rollers 46 and 47 ride on the top surface of rail 13. The location of the transverse carriage 17 relative to rails 12 and 13 is visually determined by the use of a finger 48 secured to bar 44 and extended down over the outside of rail 13. Finger 48 is located adjacent a longitudinal scale 49 secured to the outside of rail 13. A transverse beam 51 extends between supports 27 and 28. Bolts 52 secured one end of beam 51 to body 42. In like manner, bolts 53, shown in FIG. 1, secure the opposite end of beam 51 to the support 27. Elongated linear racks 54 and 56 are secured to the inside of rails 12 and 13 adjacent body 42 of supports 27 and 28. Pinions 57 and 58 located in engagement with racks 54 and 56 respectively are connected to a transverse shaft 59. Opposite ends of shaft 59 are rotatably mounted in bearing blocks 61 and 62 secured to bodies 42. Pinions 57 and 58, being secured to shaft 59, ensure that opposite ends of the transverse beam 51 move together during the adjustment of the transverse carriage assembly 17 on rails 12 and 13 indicated by arrow 19.

A manually moveable locking dog or pawl 63 holds the transverse carriage assembly 17 in a selected position along rails 12 and 13. Pawl 63 is pivotally mounted on an axle 64 secured to bar 44 and bearing block 62 above pinion 58. The bottom side pawl 63 has a plurality of teeth that inter-engage with the teeth of the pinion 58 when the pawl is in its down or locked position to prevent rotation of pinions 57 and 58, thereby holding the transverse carriage assembly 17 is a selected position relative to rails 12 and 13. Other locking devices can be used to hold carriage assembly in a fixed position on rails 12 and 13.

Transverse carriage assembly 17 has multiple clamp units 66, 67, and 68 operable to clamp one end of the plastic sheet 15 to the bottom surface of beam 51. Transverse carriage assembly 18 has multiple identical clamp units 69, 70 and 71 operable to clamp the opposite end of sheet 15 to the bottom surface of beam 51A. Clamp units 66–71 are identical in structure and function. Two or more of the clamp units are used to secure the ends of plastic sheet 15 to beams 51 and 51A. The following description is directed to the detailed structure of clamp unit 70 as shown in FIGS. 6, 7 and 8.

Clamp unit 70 has a body with upper and lower ears or ribs 73 and 74 located in transverse grooves 76 and 77 in beam 51A. A plate 78 attached to the top of beam 51A holds the body 72 in assembled relation with beam 51A. The body 72 can be selectively positioned along the length of beam 51A as required by the size of plastic sheet 15. Additional clamp units can be used to hold the plastic sheet 15 in engagement with the bottom surface of beam 51A.

A pair of outwardly and downwardly directed arms 79 and 81 are secured to opposite sides of body 72 with conventional bolts. A linear actuator, shown as a double acting cylinder 82, is pivotally mounted on the ends of arms 79 and 81 with outwardly directed pins 83 and 84. Cylinder 82 can be operated with air or hydraulic fluid under pressure. Cylinder 82 is in alignment with a pivotally pawl 86. Pawl 86 is a generally reverse, L-shaped member that is pivoted with pivot pins 87 to opposite sides of body 72. Pawl 86 has a generally flat elongated lower lip 88 adapted to engage the edge of plastic sheet 15 as shown in FIG. 6 to clamp the plastic sheet 15 into holding engagement with the bottom surface of beam 51A. Pawl 86 is controlled with the piston rod 89 of double acting air cylinder 82. A pin 91 pivotally connects the outer end of piston rod 89 to the apex of pawl 86. As shown in FIG. 8, when cylinder 82 is in the retracted position, pawl 86, along with the lower lip 88, is moved laterally of the bottom of beam 51A, so that the sheet 15 can be initially located below 51A. On actuation of the double acting cylinder 82 with suitable air controls including valves and a supply of air under pressure. Pawl 86 is moved to its forward or hold position as shown in FIG. 6 to clamp plastic sheet 15 to the bottom surface of beam 51A.

Moveable supports 34, 36 at opposite ends of carriage assembly 22 and movable supports 37 and 38 at opposite ends of the carriage assembly 23 are identical in structure and function. Each support serves as a roller assembly to insure the movement of the carriage assemblies 22 and 23 along side rails 14 and 16. The movable supports also function as releasable clamps that hold the carriage assemblies 22 and 23 in fixed positions on rails 14 and 16. The following description is directed to a moveable support 34 as shown in detail in FIGS. 9 to 12.

Moveable support 34 has a generally flat body or plate 92 that supports top rollers 93 and 94 that rid on the top of the rail 14. Rollers 96 and 97 are rotatably mounted on the lower portion of body 92 and engage the lower surface of rail 14. An upwardly directed finger 98 secured to body 92 is located adjacent to a linear scale 99 secured to the side. Scale 99 is attached to the outside of rail 14 so that the operator can use finger 98 to locate the position of carriage assembly 22 relative to indicia on scale 99.

A vertically moveable plate 101 mounted on body 92 has upright side flanges 102 and 103 that fit into complimentary grooves in body 92. A longitudinal beam 104 is secured to the inside of plate 101. Beam 104 extends the length of frame 11 and is secured at its opposite ends and to the moveable support 36. A block 109 secured to the bottom of plate 101 carries an upwardly directed shoe 106 that engages the bottom of rail 14. A plurality of pins 107 secured to block 109 are surrounded by springs 108 guide and bias shoe 106 in an upward direction into engagement with the bottom of rail 14.

A pivoting handle 111 located adjacent the top of body 92 is secured to body 92 with pivot pin 112. As shown in FIGS. 10 and 12, link 113 pivotally connected with pins 114 and 116 to handle 111 and plate 110 function to clamp shoe 106 and a pad 117 on handle 111 into engagement with the top and bottom sides of rail 14, thereby fix the position of the moveable support on rail 14. As seen in FIG. 9, handle 111 is located in an over-centered, locked position to firmly hold the shoe 106 and pad 117 in engagement with rail 14. When handle 111 is lifted or pivoted in an upward direction, the link 113 forces plate 101 in a downward direction, thereby lowering the longitudinal beam 104 and releasing the clamping force of the shoe 106 and pad 117 on rail 14. The carriage assembly is free to be moved along rail 14 to provide for a selected adjustment of the carriage assembly 22 on rails 14 and 16. The lowered beam 104 allows for easy movement while adjusting for plastic sheet width.

Figure 15:
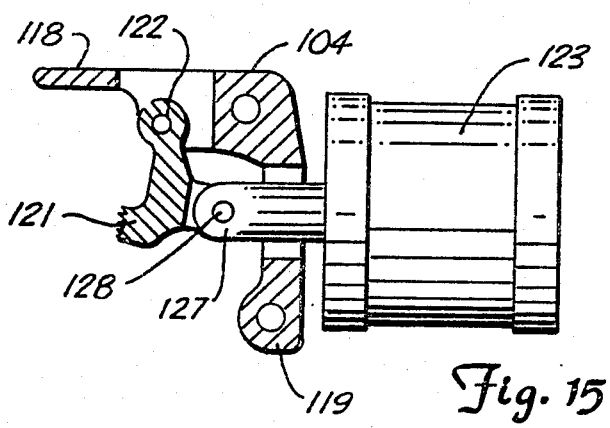
FIG. 15 is a sectional view similar to FIG. 13 showing the clamping jaw in the open position.

As shown in FIGS. 13 and 15, beam 104 has a generally horizontal lip 118 and a downwardly directed leg 119. The lip 118 has a lower surface which is engaged by plastic sheet 15 and retained thereon with a pivoting jaw 121. A horizontal pivot 122 pivotally connects jaw 121 to beam 104 and allow jaw 121 to be moved to its closed position, as shown in FIG. 13, and an open position, as shown in FIG. 15. The jaw 121 is moved by operation of a linear actuator 123, shown as a double-acting air cylinder. The air cylinder is located between tabs 124 and 125 as seen in FIG. 1. Tabs 124 and 126 accommodate pivot pins (not shown) that pivotally joins the inner end of the cylinder to beam 104. Cylinder 123 has a piston rod 127 that extends to jaw 121 and is pivotally connected thereto with pivot pin 128. Jaw 121 is connected to several linear actuators along its length as shown in FIG. 1. The actuators are operated together to selectively move the jaw 129 between its open and closed positions. Carriage assembly 123 has similar double-acting air cylinders that move a clamping jaw between a clamped position adjacent beam 104A to a release position to allow sheet 15 to be released from beam 104A.

In use, frame 11 is part of the thermo form machine that supports the transverse carriage assemblies 17 and 18 and longitudinal assemblies 22 and 23. These carriage assemblies must be located on the frame to accommodate a plastic sheet 15 having a selected length and width. Carriage assemblies 17 and 18 are longitudinally adjustable along the length of frame 11, so that clamping apparatuses 32 and 33 on carriage assemblies 17 and 18, respectively, will operate to clamp onto opposite ends of plastic sheet 15. This adjustment is achieved by releasing locking dog 63 from rack 56. The transverse carriage assembly 17 can be manually moved to the desired position. A release of a similar locking dog on carriage assembly 18 will allow the carriage assembly to be manually moved to fit the opposite end of plastic sheet 15.

Longitudinal carriage assemblies 22 and 23 are adjustable along the length of side rails 14 and 16. Handle 111 of each moveable support is moved in an upward direction, thereby releasing the movable support from its clamped position on side rails 14 and 16. Beam 104 is manually moveable to accommodate the width of sheet 15. Longitudinal carriage assembly 23 is adjusted in a similar manner. Handles 11 are then moved to a down position, thereby clamping the moveable supports 34, 36, 37 and 38 onto side rails 14 and 16. Clamping apparatuses 39 and 41 are then actuated to clamp opposite sides of plastic sheet 15 to beams 104 and 104A, respectively.

Referring to FIG. 16, there is shown a modification of the work holding apparatus of the invention indicated generally at 200 horizontally supporting a sheet 215 of thermoformable plastic. Apparatus 200 has an adjustable clamp frame assembly usable with conventional thermoform machines that reshape a plastic sheet 215 with the use of heat and vacuum or air pressure. Apparatus 200 is adjustable to accommodate different sizes of plastic sheets. This adjustment is made in a relatively short period of time without the use of special tools or removing parts. The clamp frame assembly is versatile in use and saves considerable time and labor in running thermoform machines. Thermo form machines have generally rectangular frames that support beams that hold the plastic sheets. The frames are part of turntables that sequentially move the frames through the operating cycles of the machine.

FIG. 16 shows a generally rectangular frame 211 comprising a pair of longitudinal side rails 212 and 213 joined to transverse end rails 214 and 216. Rails 212, 213, 214, and 216 are elongated, linear box beams welded together to form a unitary, rectangular frame 211. The frame 211 is mounted on the thermo form machine (not shown) for movement relative to a mold used to shape the plastic sheet to a desired configuration.

As shown in FIG. 16, first or transverse carriage assemblies, indicated generally at 219 and 221, extend across frame 211 and are movably mounted on side rails 212 and 213. Carriage assembly 219 has a transverse linear member of beam 222 mounted on moveable supports or roller assemblies 223 and 224 which support carriage assembly 219 for movement along rails 212 and 213. Roller assembly 223 is a moveable support having an upright inwardly directed plate 226 secured to a generally horizontal bar 227. A pair of top rollers 228 and 229 are rotatably mounted on horizontal transverse axles secured to opposite ends of bar 227. Rollers 228 and 229 ride on top surface 231 of side rail 213. The lower portion of plate 226 rotatably supports a bottom roller 232 that rides on bottom surface 233 of side rail 213. A second pair of side rollers 234 and 236, as seen in FIG. 20, rotatably mounted on generally vertical axles secured to the bottom side of opposite ends of bar 226. Side rollers 234 and 236 ride on the inside surface 237 of side rail 213. As seen in FIGS. 19 and 21, an elongated linear strip or strap 38 is secured to the outside of side rail 213. Strip 238 contains longitudinally spaced indicia representing length, such as inches or centimeters. A downwardly turned finger 239 is secured to the center of bar 227. Finger 239 has a pointer 241 that is located immediately adjacent the outside of the indicia strip 238 to provide the operator with an accurate positioning of transverse carriage assembly 219 relative to frame 211.

Roller assembly 224 has the same structure as roller assembly 223 including the rollers that ride on the top, bottom and inside surfaces of side rail 212. As seen in FIG. 16, carriage assembly 221 has an upright inwardly directed plate 242 secured to an end of the cross beam 222 and a longitudinal bar 243. Top rollers 244 and 246 are rotatably mounted on opposite ends of bar 243 and ride on the top surface of side rail 212.

Carriage assembly 221 is identical in structure with the carriage assembly 219 and has a transverse member or beam 247 secured at its opposite ends to roller assemblies 248 and 249. Roller assemblies 248 and 249 are identical in structure to roller assemblies 223 and 224 respectively and ride on side rails 212 and 213 whereby the carriage assembly moves along the rails. The movement of carriage assemblies 219 and 221 along side rails 212 and 213 are independent of each other. Adjustment of the position of one or both of the carriage assemblies will change the lateral distances between transverse beams 222 and 247 to accommodate different lengths of plastic sheets.

As shown in FIG. 17, carriage assembly 219 is moved along the length of side rails 212 and 213 by a manually operated adjusting mechanism indicated generally at 251. Adjusting mechanism 251 includes an elongated linear screw 252 having a forward end rotatably supported in a centrally located bearing block 253. A plate 254 extended over the top of the center of side rail 213 is secured with bolts 256 to bearing block 253 to fix the location of bearing block 253 in the center of side rail 213. The outer end of screw 252 is rotatably mounted in a bearing block 257 attached to end rail 214 with a plate 258 and bolts 259. A nut 261 is threaded on screw 252. As shown in FIGS. 16, 19, 24, and 21, nut 261 is mounted on the lower end of plate 226 so that on rotation of screw 252 carriage assembly 219 will move along the linear length of side rail 213 as indicated by the arrow 263 in FIG. 17. Screw 252 is manually rotated in clockwise or counterclockwise direction with a crank 265 that is releasably connected to a non-circular end 264 of screw 252 that projects outwardly from block 257 as shown in FIG. 17. Carriage assembly 219 is movable between the center plate 254 and a stop 266 adjustably mounted on the outer end of side rail 213 as seen in FIGS. 16 and 17. Second transverse carriage assembly 221 is longitudinally movable on side rails 212 and 213 with a manually operated adjusting mechanism indicated generally at 267. Adjusting mechanism 267 has an elongated linear screw 252 having a forward end rotatably mounted in the bearing block 253. The opposite or outer end is rotatably mounted on a bearing block 271 attached to end rail 216 with a plate 272 and bolts 273. Screw 269 is threaded through a nut 274 secured to plate 276 of roller assembly 221. The outer end of screw 252 has a sprocket and chain drive 277 connecting it to a screw (not shown) rotatably mounted on side rail 212 and operably connect with nuts (not shown) to roller assemblies 223 and 224. Screws 252 and 269 are on a single rod or shaft. The screws 252 and 269 have opposite helical turns with one screw being a right hand thread and the other screw a left hand thread. When the rod is rotated with crank 265, carriage assemblies 219 and 221 move relative to each other between center plate 254 and stops 278 and 266 mounted on side rail 213 as seen in FIGS. 16 and 17.

The operator of the work holding apparatus 200 can individually select the longitudinal positions of the transverse carriage assemblies 219 and 221 to accommodate the different lengths of plastic sheets. This is merely done by using crank 265 to manually rotate screws 252, 269 and corresponding opposite screws. When the screws are not rotated they hold beams 222 and 247 in selected positions relative to side rails 212 and 213. Motors, such as air, liquid or electric operated motors, can be used to selectively rotate the screws. Suitable operator controls can be used to selectively operate the these motors.

Figure 22:
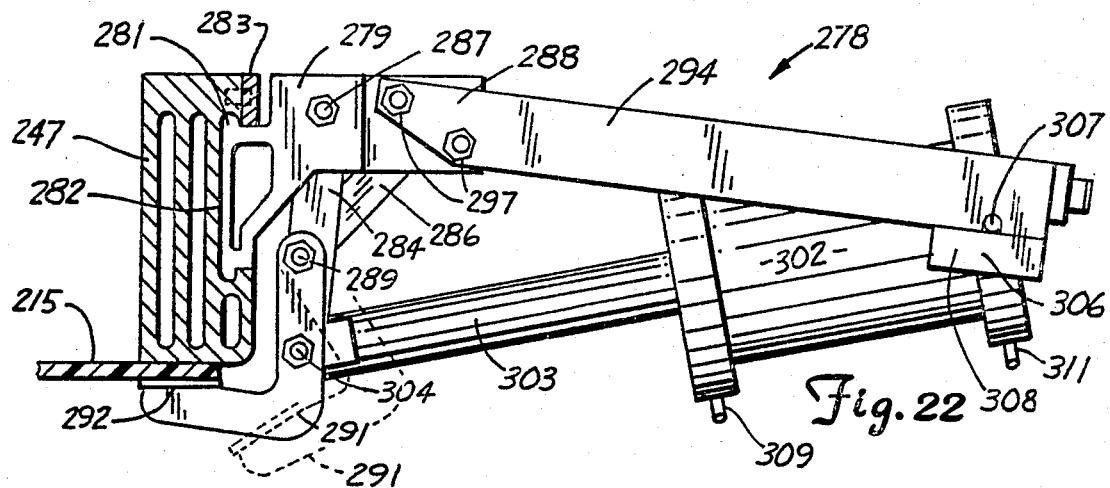
FIG. 22 is an enlarged sectional view taken along the line 22—22 of FIG. 16.
Figure 23:
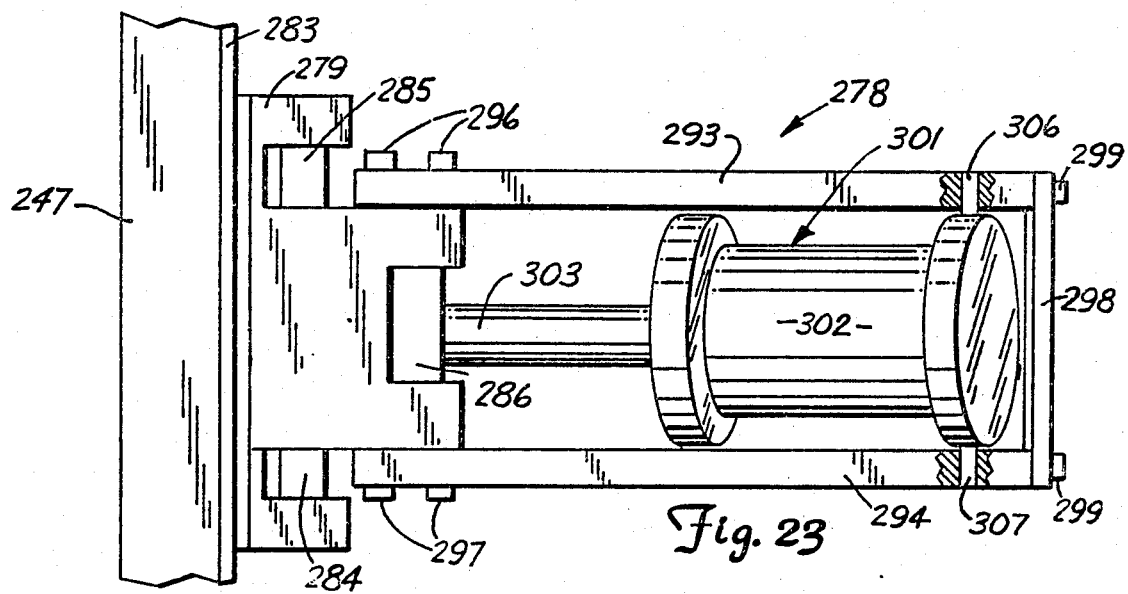
FIG. 23 is a top view of FIG. 22.

Referring to FIGS. 22 and 23, there is shown a clamping unit indicated generally at 278 mounted on transverse beam 247. Clamping unit 278 functions with additional clamping units to hold the end of plastic sheet 215 into engagement with the bottom of transverse beam 247. Clamp unit 278 has a body 279 that includes a head 281 located in a transverse groove in transverse beam 247. A flange 283 secured to the outside of beam 247 holds head 281 in groove 282. Flange 283 can be removed to allow additional clamp units to be mounted on transverse beam 247 or the removal of clamp units therefrom. Each clamp unit has a pair of links 284 and 285 pivotally connected with a pin 287 to body 279. A third link 286 pivotally connected with pivot 288 to body 279 extends downwardly and is joined to the lower end of links 284 with a pivot pin 289. Pawl 291 is pivotally connected to the pin 289. Pawl 291 is a generally angular hook having a lower toe 292 adapted to engage the edge of plastic sheet 215 and firmly hold plastic sheet in engagement with the bottom of transverse beam 247.

As shown in FIG. 23, a pair of arms 293 and 294 are secured to body 279 with bolts 296 and 297. Arms 293 and 294 extend in the generally longitudinal direction or laterally from transverse beam 247. The rear ends of arms 293 and 294 are connected with a cross bar 298. Bar 298 is attached to arms 293 and 294 with bolts 299. An extendable and contractible unit, shown as a double acting air piston cylinder assembly 301 is located between arms 293 and 934. Piston and cylinder assembly 301 has a cylinder 302 slidably accommodating a piston rod 303. A pivot pin 304 pivotally connects the outer end of piston rod 303 to pawl 291 below pivot 289. Cylinder 302 is pivotally mounted on arms 293 and 294 with stubs 306 and 307 secured to opposite sides of cylinder 302 and extended into recesses in the lower portions of the outer ends of arms 293 and 294. A plate 308 retains studs 306 and 307 in the recesses in arms 293 and 294. Suitable air lines 309 and 311 are connected to opposite ends of cylinder 302 so that air under pressure can selectively elongate and contract the piston and cylinder assembly thereby pivot pawl 291 between a closed or locked position as shown in full lines in FIG. 22 and a release or open position as shown in broken lines.

Returning to FIG. 16, clamp unit 278 is one of the multiple clamp units that are mounted on cross beams 247. Each of clamp units operate in the same manner as the clamp unit 278. Cross beam 222 supports four clamp units 316, 317, 318, and 319. Clamp units 316–319 are identical in structure and operation to clamp unit 278. Each of the clamp units are separate from each other and can slide on common cross beams 222 or 227. As longitudinal beams 323 and 328 move toward each other excess clamp units on cross beams 222 and 227 can be moved outward to clear cross beams 323 and 328. The air lines for each of the piston and cylinder assemblies of the clamp units are connected to valve controls and a source of air under pressure (not shown). The clamp units on the cross beams 221 and 227 operate to releasably hold opposite ends of the plastic sheet 215 in engagement with the bottom surfaces of the cross beams 222 and 227.

Figure 24:
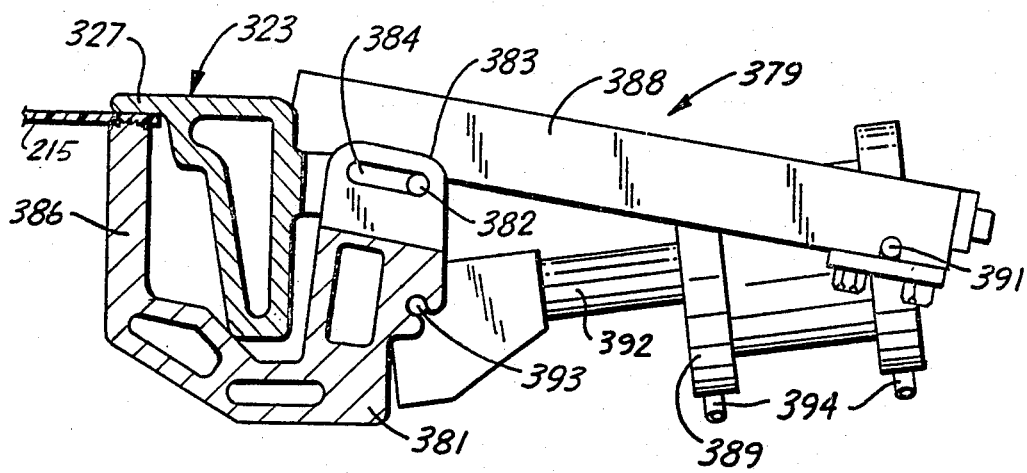
FIG. 24 is an enlarged sectional view taken along the line 24—24 of FIG. 16.

Returning to FIG. 16, work holding apparatus 200 has a pair of second or longitudinal carriage assemblies 321 and 322 extended generally parallel to side rails 212 and 213. Longitudinal carriage assembly 321 has an elongated beam 323 that extends between end members 214 and 216. Roller assemblies 324 and 326 secured to opposite ends of beam 323 movably mount beam 323 on end rails 214 and 216 for movement along these rails. Roller assemblies 324 and 326 are identical in structure to roller assembly 223 as shown in FIGS. 19, 20, and 21. Beam 323, as seen in FIG. 24, has a top elongated linear lip 327 that has a lower surface that engages a longitudinal edge of plastic sheet 215.

Longitudinal carriage assembly 322 has an elongated beam 328 extended between end rails 214 and 216 parallel to beam 323. Roller assemblies 329 and 331 connected to opposite ends of beam 328 movably mount beam 328 on the end rails 214 and 216 for movement along these rails. Beams 323 and 328 can be laterally moved relative to each other to accommodate plastic sheets having different widths.

Roller assemblies 326 and 331 have upwardly directed plates 332 and 333 that are secured to beams 323 and 328 respectively. A first manually operated adjusting mechanism indicated generally at 337 cooperates with a second manually operated adjusting mechanism indicated generally at 344 moving the beam 328 along side rails 214 and 216 to accommodate plastic sheets having different widths. Adjusting mechanism 337, as seen in FIG. 18, has an elongated linear screw 338 rotatably supported at its inner end in a bearing block 339. A plate 341 and a plurality of bolts 342 secure bearing block 339 to the center of side rail 216. The outer end of screw 338 is rotatably mounted in bearing block 271. Screw 338 is threadably associated with a nut 343 mounted on the lower end of plate 333. Adjusting mechanism 344 has a similar screw 346 having an inner end rotatably mounted in a bearing block 347 attached to the center of end rail 214 with a plate 348 and a plurality of bolts 349. The outer end of screw 346 is rotatably mounted in bearing block 257. A nut 350, mounted on an upright plate 336 of roller assembly 329 accommodates screw 346.

Referring to FIG. 26, an endless roller link chain 351 drivably connects screws 338 and 346. Chain 351 is trained about a first sprocket 352 secured to screw 338 and a second sprocket 353 mounted on screw 346. The mid-portion of chain 351 rides in a generally U-shaped bracket 354 secured to center bearing block 253. As shown in FIG. 16, the outer end of screw 346 has a non-circular end 356 that accommodates the socket of crank 265 so that screw 346 can be manually rotated simultaneously with the rotation of screw 338 via chin 351 so that both ends of longitudinal beams 323 and 328 are laterally moved together relative to end rails 214 and 216. Screw 338 can also have a non-circular end adapted to accommodate the socket of crank 265. The concurrent rotation of screws 338 and 346 will laterally move beams 323 and 328 along side rails 214 and 216 as the screws 338 and 346 are turned in the same direction relative to nuts 343 and 366 that are carried by plates 324, 326, 333 and 336 of roller assemblies connected to opposite ends of beams 323 and 328. The beams 323 and 328 will move in the directions of arrows 359 and 357 depending on the direction of rotation of crank 265. The operator can selectively increase or decrease the lateral distance between beams 323 and 328. When screws 338 and 346 are not rotated they hold beams 323 and 328 in a selected position relative to end rails 214 and 216. Motors, such as air, liquid or electric operated motors, can be used to selectively rotate screws 338 and 346. Suitable operator controls can be used to selectively operate these motors.

As shown in FIG. 17, crank 265 is used to concurrently rotate screw 252 and the screw (not shown) adjacent side rail 212. Chain and sprocket drive 277 drivably connects the screws. The screw and associated nuts adjacent side rail 212 have the same structure as screw 252 and nuts 226 and 274 as shown in FIG. 17. This causes cross beams 222 and 227 to move along side rails 212 and 213 relative to each other, as shown by arrows 263 and 268, to accommodate different lengths of plastic sheets. When the screw 252 and screw adjacent side rail 212 are not rotated, they hold beams 222 and 227 in selected positions relative to rails 212 and 213.

Returning to FIG. 16, a plurality of a first set of clamping units 378–383 are mounted on beam 323 for holding one side edge of plastic sheet 215 in engagement with bottom surface of lip 327 of beam 323. A plurality of clamping units 384–389 are mounted on beam 328 and function to hold the opposite side edge of plastic sheet 215 on the bottom surface of beam 328. The clamp units 378–389 are identical in structure.

Figure 25:
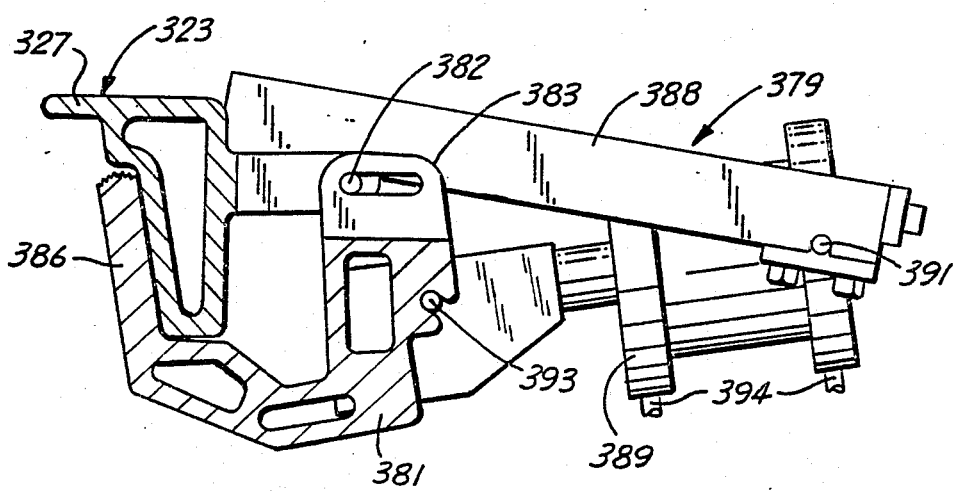
FIG. 25 is a sectional view similar to FIG. 24 with the clamping jaw open.

The following description is to the clamp unit 379 shown in FIG. 24. Clamp unit 379 has a body 381 that is mounted on the outside of beam 323 with a pivot member 382. The opposite ends of pivot member 282 are anchored on a flange 383 joined to the back of beam 323. Body 381 has an elongated slot 384 accommodating pivot member 382 which allows body 381 to be moved laterally of beam 323. Body 381 has an upwardly direct arm 386 movable to an up position, shown in FIG. 24, to clamp sheet 215 to the underside of lip 327 and movable to a down position, shown in FIG. 25, to release sheet 215 from beam 323. A pair of arms 387 and 388 mounted on flange 383 extend downwardly adjacent opposite sides of a linear actuator, shown as a double acting fluid cylinder 389. Pins 391 pivotally mount the outer end of air cylinder 389 to arms 387 and 388. Air cylinder 389 has a piston 392 connected to body 381 with pin 393. Cylinder 389 is coupled to an air supply system with air lines 394. The system has valve controls that operate the cylinder 389 to move body 381 between its open and closed positions. The air system is connected to all of the clamp units so that the operator can hold the entire peripheral edge of plastic sheet 215 in engagement with beams 323 and 328 as well as transverse beams 222 and 247.

In use, clamp frame assembly 200 is associated with a thermo form machine which changes the shape of a generally flat plastic sheet into a contoured plastic object with heat and vacuum or pressure. The plastic sheet is thermoformable plastic, such as ABS plastic. The details of the structure and operation of a thermo form machine do not form part of the invention.

The operator of the clamp frame assembly 200 utilizes hand crank 265 to selectively change the locations of cross beams 222 and 247 relative to side rails 212 and 213 to accommodate plastic sheets having different lengths. Crank 265 is also used to change the lateral positions of longitudinal beams 323 and 328 to accommodate plastic sheets having different widths. Crank 265 is used to rotate screw 252 and screw adjacent side rail 212, as seen in FIG. 17, to change positions of transverse beams 222 and 247 as indicated by the arrows 263 and 268 in FIG. 16. When crank 265 is used to concurrently rotate screws 338 and 346, the transverse positions of longitudinal beams 323 and 328 are changed as indicated by the arrow 359 and 377. When all of the screws are not rotated, the transverse beams 222 and 247 and longitudinal beams 323 and 328 are fixed in their locations. The bottom surfaces of lips 327 of beams 323 and 324 engage side edges of plastic sheet 215. The bottom surfaces of beams 222 and 247 are located adjacent to the bottom surfaces of the lips 327 of beams 323 and 328 and extend over these beams. Thus, the adjacent surfaces of beams 323 and 328 and 222 and 247 are unrestricted so that the plastic sheet can be located adjacent the surfaces and clamp thereto with the operation of the clamp units. When fluid under pressure is supplied to the double acting cylinders of each of the clamp units, the clamping arms of the units will engage the side edges and end edges of the plastic sheet clamping them into tight engagement with beams 323 and 328 and cross beams 222 and 247 respectively.

The positions of beams 222, 247, 323 and 328 relative to the side and end rails of the frame assembly are calibrated with the use of scales 238 that are located on the side and end rails. This is done without disconnecting any air or fluid lines or removing or loosening any nuts or bolts. The size of the clamp frame assembly can be quickly changed to obtain infinite rectangular dimensions accommodate different sizes of plastic sheets to allow short production runs with a minimum of the down time of the thermo form machine.

The foregoing description and illustration of the adjustable clamp frame assembly is the preferred embodiments thereof, numerous modifications and changes are readily apparent to those skilled in the art. It is not desired to limit the invention to the exact construction and operation as shown and described, accordingly, all suitable modifications and equivalence may be resorted to following within the scope of the invention as claimed.

I claim:

1. A frame assembly for holding a plastic sheet in a thermo form machine comprising: a frame having longitudinal side rails and transverse end rails normally disposed relative to the side rails, said side rails extended generally parallel to each other and having first and second opposite ends, said end rails being secured to the first and second ends of the side rails providing said frame with a rectangular shape, said side rails and end rails each have flat horizontal parallel top and bottom surfaces and an upright flat inside surface extended between said top and bottom surfaces, first and second longitudinal beams extended between said end rails generally parallel to said side rails, first roller means mounting the first and second beams on the end rails for movement along said end rails, a first adjusting mechanism connected to the first beam operable to selectively move the first beam along the end rails and hold the first beam in a selected position, a second adjusting mechanism connected to the second beam operable to selectively move the second beam along the end rails and hold the second beam in a selected position relative to the first beam whereby the distance between the first and second beams can be adjusted, first clamp means mounted on the first beam operable to hold one side edge of the plastic sheet on the first beam, second clamp means mounted on the second beam operable to hold the other side edge of the plastic sheet on the second beam, third and fourth transverse beams extended between said side rails across said first and second beams, second roller means mounting the third and fourth beams on the side rails for movement along said side rails, each roller means has a plurality of first rollers that ride on the top surface, at least one second roller that rides on the bottom surface, and a plurality of third rollers that roll on the inside surface whereby each roller means is free to roll along the rail supporting the roller means, a third adjusting mechanism connected to the third beam operable to selectively move the third beam along said side rails and hold the third beam in a selected position, a fourth adjusting mechanism connected to the fourth beam operable to selectively move the fourth beam along said side rails and hold the fourth beam in a selected position, whereby the distance between the third and fourth beams can be adjusted, third clamp means mounted on the third beam operable to hold one end edge of the plastic sheet on the third beam, fourth clamp means mounted on the fourth beam operable to hold the other end edge of the plastic sheet on the fourth beam, said movements of the first, second, third, and fourth beams allowing different sizes of plastic sheets to be held by the frame assembly, and each of said clamp means being releasable whereby the plastic sheet can be placed on the beams and removed therefrom.

2. The frame assembly of claim 1 wherein: said third and fourth clamp means includes a plurality of clamp units, each clamp unit having movable members adapted to engage the plastic sheet and hold the plastic sheet in engagement with a beam, and means connected to the movable members operable to move the movable members between a holding position and a release position.

3. The frame assembly of claim 2 wherein: the means connected to the movable members comprises linear actuators.

4. The frame assembly of claim 2 wherein: the third and fourth clamp means each include a clamp unit having a body and means mounting the body on a respective beam, and a movable member connected to the body whereby the clamp unit can be selectively moved along the length of the respective beam.

5. The frame assembly of claim 4 wherein: the means mounting the body of a beam includes cooperating structures on the body and beam comprising a groove, a head located in the groove, and means holding the head in the groove.

6. The frame assembly of claim 1 wherein: the third and fourth beams and the third and fourth clamp means have cooperating structures that mount the third clamp means on the third beam and the fourth clamp means on the fourth beam whereby the third and fourth clamp means can be selectively moved along the length of the third and fourth beams.

7. The frame assembly of claim 6 wherein: the cooperating structures include a groove, a head located in the groove, and means holding the head in the groove.

8. The frame assembly of claim 1 wherein: the first and second beams have bottom surfaces that engage the side edges of the sheet material, said first and second clamp means operable to hold the side edges of the plastic sheet in engagement with said bottom surfaces of the first and second beams, said third and fourth beams having bottom surfaces that engage the end edges of the plastic sheet, said third and fourth clamp means operable to hold the end edges of the plastic sheet in engagement with said bottom surfaces of the third and fourth beams.

9. A frame assembly for holding a plastic sheet in a thermo form machine comprising: a frame having longitudinal side rails and transverse end rails normally disposed relative to the side rails, said side rails extended generally parallel to each other and having first and second opposite ends, said end rails being secured to the first and second ends of the side rails providing said frame with a rectangular shape, first and second longitudinal beams extended between said end rails generally parallel to said side rails, first roller means mounting the first and second beams on the end rails for movement along said end rails, a first adjusting mechanism connected to the first beam operable to selectively move the first beam along the end rails and hold the first beam in a selected position, a second adjusting mechanism connected to the second beam operable to selectively move the second beam along the end rails and hold the second beam in a selected position relative to the first beam whereby the distance between the first and second beams can be adjusted, first clamp means mounted on the first beam operable to hold one side edge of the plastic sheet on the first beams, second clamp means mounted on the second beam operable to hold the other side edge of the plastic sheet on the second beam, third and fourth transverse beams extended between said side rails across said first and second beams, second roller means mounting the third and fourth beams on the side rails for movement along said side rails, a third adjusting mechanism connected to the third beam operable to selectively move the third beam along said side rails and hold the third beam in a selected position, a fourth adjusting mechanism connected to the fourth beam operable to selectively move the fourth beam along said side rails and hold the fourth beam in a selected position, whereby the distance between the third and fourth beams can be adjusted, third clamp means mounted on the third beam operable to hold one end edge of the plastic sheet on the third beam, fourth clamp means mounted on the fourth beam operable to hold the other end edge of the plastic sheet on the fourth beam, said movements of the first, second, third, and fourth beams allowing different sizes of plastic sheets to be held by the frame assembly, and each of said clamp means being releasable whereby the plastic sheet can be placed on the beams and removed therefrom, the first adjusting mechanism includes a first elongated screw rotatably mounted on the frame for rotation about the longitudinal axis of the screw and a nut mounted on the first roller means, said screw being threaded through said nut whereby, on rotation of the screw, the first beam is moved along said end rails.

10. A frame assembly for holding a plastic sheet in a thermo form machine comprising: a frame having longitudinal side rails and transverse end rails normally disposed relative to the side rails, said side rails extended generally parallel to each other and having first and second opposite ends, said end rails being secured to the first and second ends of the side rails providing said frame with a rectangular shape, first and second longitudinal beams extended between said end rails generally parallel to said side rails, first roller means mounting the first and second beams on the end rails for movement along said end rails, a first adjusting mechanism connected to the first beam operable to selectively move the first beam along the end rails and hold the first beam in a selected position, a second adjusting mechanism connected to the second beam operable to selectively move the second beam along the end rails and hold the second beam in a selected position relative to the first beam whereby the distance between the first and second beams can be adjusted, first clamp means mounted on the first beam operable to hold one side edge of the plastic sheet on the first beam, second clamp means mounted on the second beam operable to hold the other side edge of the plastic sheet on the second beam, third and fourth transverse beams extended between said side rails across said first and second beams, second roller means mounting the third and fourth beams on the side rails for movement along said side rails, a third adjusting mechanism connected to the third beam operable to selectively move the third beam along said side rails and hold the third beam in a selected position, a fourth adjusting mechanism connected to the fourth beam operable to selectively move the fourth beam along said side rails and hold the fourth beam in a selected position, whereby the distance between the third and fourth beams can be adjusted, third clamp means mounted on the third beam operable to hold one end edge of the plastic sheet on the third beam, fourth clamp means mounted on the fourth beam operable to hold the other end edge of the plastic sheet on the fourth beam, said movements of the first, second, third, and fourth beams allowing different sizes of plastic sheets to be held by the frame assembly, and each of said clamp means being releasable whereby the plastic sheet can be placed on the beams and removed therefrom, the first adjusting mechanism includes first and second elongated screws located adjacent the end rails, nut means mounted on the first roller means threadably engaging the first and second screws, and means drivably connecting the first and second screws whereby the first and second screws are concurrently rotated to move the first beam along the end rails.

11. The frame assembly of claim 10 wherein: the means drivably connecting the first and second screws include sprockets mounted on the first and second screws and an endless roller chain trained about said sprockets whereby rotation of one screw will concurrently rotate the other screw.

12. A frame assembly for holding a plastic sheet in a thermo form machine comprising: a frame having longitudinal side rails and transverse end rails normally disposed relative to the side rails, said side rails extended generally parallel to each other and having first and second opposite ends, said end rails being secured to the first and second ends of the side rails providing said frame with a rectangular shape, first and second longitudinal beams extended between said end rails generally parallel to said side rails, first roller means mounting the first and second beams on the end rails for movement along said end rails, a first adjusting mechanism connected to the first beam operable to selectively move the first beam along the end rails and hold the first beam in a selected position, a second adjusting mechanism connected to the second beam operable to selectively move the second beam along the end rails and hold the second beam in a selected position relative to the first beam whereby the distance between the first and second beams can be adjusted, first clamp means mounted on the first beam operable to hold one side edge of the plastic sheet on the first beam, second clamp means mounted on the second beam operable to hold the other side edge of the plastic sheet on the second beam, third and fourth transverse beams extended between said side rails across said first and second beams, second roller means mounting the third and fourth beams on the side rails for movement along said side rails, a third adjusting mechanism connected to the third beam operable to selectively move the third beam along said side rails and hold the third beam in a selected position, a fourth adjusting mechanism connected to the fourth beam operable to selectively move the fourth beam along said side rails and hold the fourth beam in a selected position, whereby the distance between the third and fourth beams can be adjusted, third clamp means mounted on the third beam operable to hold one end edge of the plastic sheet on the third beam, fourth clamp means mounted on the fourth beam operable to hold the other end edge of the plastic sheet on the fourth beam, said movements of the first, second, third, and fourth beams allowing different sizes of plastic sheets to be held by the frame assembly, and each of said clamp means being releasable whereby the plastic sheet can be placed on the beams and removed therefrom, the third adjusting means includes an elongated first screw extended along a side rail, means mounting the screw on the frame for rotation about the longitudinal axis, of the screw and nut means mounted on the second roller means threadably engaging the screw whereby, on rotation of the screw, the third beam will move along said side rails whereby the frame assembly can accommodate different lengths of plastic sheets.

13. The frame assembly of claim 12 wherein: the fourth adjusting means includes an elongated second screw extended along the side rail in longitudinal alignment with the first elongated screw, means mounting the second screw on the frame for rotation about the longitudinal axis of the second screw, and nut means mounted on the second roller means threadably engaging the second screw whereby, on rotation of the second screw, the fourth beam will move along said side rails relative to said third beam thereby changing the distance between the third and fourth beams to accommodate different lengths of plastic sheets.

14. A frame assembly for holding a sheet on frame means having first rail means and second rail means angularly positioned relative to said first rail means, each of said rail means having a top surface and a bottom surface comprising: first beam means for supporting the sheet, first roller assembly means for supporting the first beam means on the first rail means for movement along said first rail means, means for selectively allowing the first beam means to be moved along the first rail means and holding the first beam means in a selected position on said first rail means whereby the first beam means can be moved relative to the second rail means to accommodate plastic sheets having different widths, first clamp means mounted on the first beam means operable to hold the sheet on the first beam means, second beam means extended across the first beam means for holding portions of said sheet held on the first beam means, second roller assembly means for supporting the second beam means on the second rail means for movement along said second rail means, each roller assembly having a plurality of first rollers that ride on one surface of a rail means and at least one second roller that rides on the other surface of said rail means whereby each roller assembly is free to move along the rail means supporting the roller assembly, means for selectively allowing the second beam means to be moved along the second rail means and holding the second beam means in a selected position on said second rail means whereby the second beam means can be moved relative to the first rail means, said movements of the first and second beam means allowing different sizes of sheets to be held by the frame assembly, and second clamp means mounted on the second beam means operable to hold the portions of said sheet on the second beam means, each of said clamp means being releasable whereby the sheet can be placed on the frame assembly and removed therefrom.

15. The frame assembly of claim 14 wherein: said plurality of first rollers ride on the top surface of the rail means and said at least one second roller rides on the bottom surface of the rail means.

16. The frame assembly of claim 14 wherein: said plurality of first rollers ride on the top surface of the rail means and said at least one second roller rides on the bottom surface of the rail means, and a plurality of third rollers that roll on another surface of the rail means whereby each roller assembly is free to roll along the rail means supporting the roller assembly.

17. The frame assembly of claim 14 wherein: said second clamp means includes a plurality of clamp units, each clamp unit having a movable member adapted to engage the sheet to hold the sheet in engagement with a beam means and means connected to the movable member operable to selectively move the movable member between the holding position and a release position whereby the sheet can be removed from the frame assembly.

18. The frame assembly of claim 17 wherein: the means connected to the movable member comprises a linear actuator.

19. The frame assembly of claim 14 wherein: the second clamp means includes at least one clamp unit having a body, and means mounting the body on the second beam means, whereby the clamp unit can be selectively moved along the length of the second beam means.

20. The frame assembly of claim 19 wherein: the means mounting the body on the second beam means includes cooperating structures on the body and second beam means comprising a groove, a head located in the groove, and means holding the head in the groove.

21. The frame assembly of claim 14 wherein: the first beam means has a bottom surface that engages the side edge of the sheet, said first clamp means being operable to hold the side edge of the sheet into engagement with said bottom surface of the first beam means, said second beam means having a bottom surface that engages an end edge of the sheet, said second clamp means operable to hold the edge of the sheet in engagement with the bottom surface of the second beam means.

22. The frame assembly of claim 14 including: releasable lock means for holding the first and second beam means in selected positions relative to said first and second rail means.

23. The frame assembly of claim 22 wherein: the releasable lock means includes a latch mounted on the first means for mounting the first beam means on the first rail means operable to hold the first beam means in a selected position.

24. The frame assembly of claim 22 wherein: the releasable lock means includes a locking clamp mounted on the second means for holding the second beam means in a selected position.

25. The frame assembly of claim 14 including: releasable lock means for holding the first and second beam means in selected positions relative to said first and second rail means, said releasable lock means including a latch mounted on the first means for mounting the first beam means on the first rail means operable to hold the first beam means in a selected position, and a locking clamp mounted on the second means for holding the second beam means on the second rail means operable to hold the second beam means in a selected position.

26. The frame assembly of claim 14 wherein: the second means for mounting the second beam means on the second rail means includes lock means for holding the second beam means in a fixed position on the second rail means, said lock means being movable to a release position to lower the second beam means to allow movement of the second beam means along the second rail means and loading of a sheet on the frame assembly.

27. A frame assembly for holding a sheet on frame means having first rail means and second rail means angularly positioned relative to said first rail means comprising: first beam means for supporting the sheet, first means for mounting the first beam means on the first rail means for movement along said first rail means, means for selectively allowing the first beam means to be moved along the first rail means and holding the first beam means in a selected position on said first rail means whereby the first beam means can be laterally moved relative to the second rail means, first clamp means mounted on the first beam means operable to hold the sheet on the first beam means, second beam means extended across the first beam means for holding portions of said sheet mounted on the first beam means, second means for mounting the second beam means on the second rail means for movement along said second rail means, means for selectively allowing the second beam means to be moved along the second rail means and holding the second beam means in a selected position on said second rail means whereby the second beam mean can be laterally moved relative to the first rail means, said movement of the first and second beam means allowing different sizes of sheets to be held by the frame assembly, and second clamp means mounted on the second beam means operable to hold the portions of said sheet on the second beam means, each of said clamp means being releasable whereby the sheet can be placed on the frame assembly and removed therefrom, means for moving the first beam means along the first rail means including a first elongated screw rotatably mounted on the frame means for rotation about the longitudinal axis of the screw and a nut mounted on the first beam means, said screw being threaded through said nut whereby, on rotation of the screw, the first beam means is moved along said first rail means.

28. A frame assembly for holding a sheet on frame means having first rail means and second rail means angularly positioned relative to said first rail means comprising: first beam means for supporting the sheet, first means for mounting the first beam means on the first rail means for movement along said first rail means, means for selectively allowing the first beam means to be moved along the first rail means and holding the first beam means in a selected position on said first rail means whereby the first beam means can be laterally moved relative to the second rail means, first clamp means mounted on the first beam means operable to hold the sheet on the first beam means, second beam means extended across the first beam means for holding portions of said sheet mounted on the first beam means, second means for mounting the second beam means on the second rail means for movement along said second rail means, means for selectively allowing the second beam means to be moved along the second rail means and holding the second beam means in a selected position on said second rail means whereby the second beam mean can be laterally moved relative to the first rail means, said movement of the first and second beam means allowing different sizes of sheets to be held by the frame assembly, and second clamp means mounted on the second beam means operable to hold the portions of said sheet on the second beam means, each of said clamp means being releasable whereby the sheet can be placed on the frame assembly and removed therefrom, means for moving the first beam means along the first rail means including first and second elongated screws located adjacent the frame means, nut means mounted on the first means threadably engaging the first and second screws, and means drivably connecting the first and second screws whereby the first and second screws are concurrently rotated to move the first beam means along the first rail means.

29. The frame assembly of claim 28 wherein: the means drivably connecting the first and second screws includes sprockets mounted on the first and second screws and an endless roller chain trained about said sprockets whereby on rotation of one screw will concurrently rotate the other screw.

30. A frame assembly for holding a sheet on frame means having first rail means and second rail means angularly positioned relative to said first rail means comprising: first beam means for supporting the sheet, first means for mounting the first beam means on the first rail means for movement along said first rail means, means for selectively allowing the first beam means to be moved along the first rail means and holding the first beam means in a selected position on said first rail means whereby the first beam means can be laterally moved relative to the second rail means, first clamp means mounted on the first beam means operable to hold the sheet on the first beam means, second beam means extended across the first beam means for holding portions of said sheet mounted on the first beam means, second means for mounting the second beam means on the second rail means for movement along said second rail means, means for selectively allowing the second beam means to be moved along the second rail means and holding the second beam means in a selected position on said second rail means whereby the second beam mean can be laterally moved relative to the first rail means, said movement of the first and second beam means allowing different sizes of sheets to be held by the frame assembly, and second clamp means mounted on the second beam means operable to hold the portions of said sheet on the second beam means, each of said clamp means being releasable whereby the sheet can be placed on the frame assembly and removed therefrom, means for moving the second beam means along the second rail means comprising an elongated screw, means rotatably mounting the screw on the frame means, and nut means connected to the second means threadably engaging the screw whereby, on rotation of the screw, the second beam means moves relative to the second rail means.

31. A frame assembly for holding a plastic sheet on a frame of a thermo form machine, said frame having a pair of longitudinal first side rails and a pair of transverse second end rails secured to said side rails, said first side rails and second end rails each having a top surface, a bottom surface, and an inside surface, said frame assembly comprising: a pair of laterally spaced longitudinal first beams for holding opposite side edges of the plastic sheet, first movable supports secured to opposite ends of said first beams for supporting the first beams on the first side rails for movement along said first rails, releasable means for holding the first movable supports and first beams secured thereto in selected positions on said first side rails whereby the first beams can be laterally moved relative to each other on the first side rails to accommodate plastic sheets having different widths, first clamp means mounted on the first beams operable to hold the plastic sheet on the first beams, a pair of second transverse beams extended across the first beams for holding opposite end edges of said plastic sheet on the first beams, second movable supports secured to opposite ends of the second beams for supporting the second beams on the second rails for movement along said second rails, said first and second moveable supports each including roller assemblies for supporting the first and second beams on their respective rails, each roller assembly having first roller means that ride on the top surface of a rail and second roller means that ride on another surface of the same rail whereby each roller assembly is free to move along the rail supporting the roller assembly, releasable lock means for holding the second movable supports and the second beams secured thereto in selected positions on said second rails whereby the second beams can be laterally moved relative to each other on the second rails, said movements of the first and second beams on said first and second rails allowing different sizes of plastic sheets to be held by the frame assembly, and second clamp means mounted on the second beams operable to hold the opposite end edges of said plastic sheet on the second beam, each of said first and second clamp means being releasable whereby the plastic sheet can be placed on the frame assembly and removed therefrom:

32. The frame assembly of claim 31 wherein: said second clamp means includes a plurality of clamp units, each clamp unit having a movable member adapted to engage the plastic sheet to hold the plastic sheet in engagement with the beams, and means connected to the movable member operable to selectively move the movable member between a hold position and a release position whereby the plastic sheet can be held on the beams and removed from the frame assembly.

33. The frame assembly of claim 31 wherein: the second clamp means includes at least one clamp unit having a body, and means mounting the body on the second beams whereby the clamp unit can be selectively moved along the length of the second beams.

34. The frame assembly of claim 33 wherein: the means mounting the body on the second beams includes cooperating structures on the body and second beams comprising a groove, a head located in the groove, and means holding the head in the groove.

35. The frame assembly of claim 31 including: releasable lock means for holding the first and second beams in selected positions relative to the first and second rails.

36. The frame assembly of claim 35 wherein: the releasable lock means includes a latch mounted on the first movable supports operable to hold the first beams in selected positions.

37. The frame assembly of claim 35 wherein: the releasable lock means includes a locking clamp mounted on the second movable supports operable to hold the second beams in selected positions.

38. The frame assembly of claim 31 including: releasable lock means for holding the first and second beams in selected positions relative to the first and second rails to accommodate different sizes of plastic sheets, said releasable lock means including a latch mounted on the first movable supports operable to hold the first beams in said selected positions, and a locking clamp mounted on the second movable supports operable to hold the second beams in said selected positions to accommodate plastic sheets having different lengths.

39. The frame assembly of claim 31 wherein: the second movable supports includes lock means for holding the second beams in selected fixed positions on said second rails, said lock means being movable to a release position to lower the second beams to allow movement of the second beams along said second rails and loading of a plastic sheet on the frame assembly.

40. The frame assembly of claim 31 wherein: said second roller means rides on the bottom surface of the rail.

41. The frame assembly of claim 31 wherein each roller assembly further include a plurality of third rollers adapted to roll on the inside surface of the respective rail.

* * * * *